US008049963B2

(12) United States Patent
Menon et al.

(10) Patent No.: US 8,049,963 B2
(45) Date of Patent: Nov. 1, 2011

(54) MULTIPLE-WAVELENGTH BINARY DIFFRACTIVE LENSES

(75) Inventors: Rajesh Menon, Cambridge, MA (US); Paul Rogge, Lincoln, NE (US); Hsin-Yu Tsai, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 286 days.

(21) Appl. No.: 12/253,512

(22) Filed: Oct. 17, 2008

(65) Prior Publication Data

US 2010/0097703 A1    Apr. 22, 2010

(51) Int. Cl.
*G02B 27/44*    (2006.01)
*G02B 3/08*    (2006.01)
(52) U.S. Cl. ........................................ 359/565; 359/742
(58) Field of Classification Search .................. 359/565, 359/566, 571, 569, 742
See application file for complete search history.

(56) References Cited

U.S. PATENT DOCUMENTS

| 5,071,207 A | * | 12/1991 | Ceglio et al. ................. 359/15 |
| 5,161,059 A | * | 11/1992 | Swanson et al. .............. 359/565 |
| 5,344,447 A | | 9/1994 | Swanson |
| 5,917,845 A | | 6/1999 | Sales et al. |
| 5,978,139 A | | 11/1999 | Hatakoshi |
| 6,166,854 A | * | 12/2000 | Katsuma ....................... 359/569 |
| 6,545,821 B2 | * | 4/2003 | Katsuma ....................... 359/721 |
| 6,707,608 B1 | | 3/2004 | Arieli et al. |
| 2005/0062928 A1 | | 3/2005 | Yau et al. |

FOREIGN PATENT DOCUMENTS

KR    10-1998-0080167    11/1998

OTHER PUBLICATIONS

Rastani, Kasra et al. "Binary phase Fresnel lenses for generation of two-dimensional beam arrays." Applied Optics, vol. 30, No. 11, Apr. 11, 1991; pp. 1347-1354.
Notification of Transmittal of the International Search Report and the Written Opinion of the International Searching Authority mailed May 27, 2010 in connection with PCT/US2009/060348.

* cited by examiner

*Primary Examiner* — Alessandro Amari
(74) *Attorney, Agent, or Firm* — Gesmer Updegrove LLP

(57) ABSTRACT

A dichromatic lens includes a plurality of zones being arranged on a lens structure, each of the zones having a specified radius and varying height. The lens structure focuses propagating light applicable to any intensity distribution for a plurality of wavelengths.

24 Claims, 10 Drawing Sheets

$160\lambda_1$ $10\lambda_1$

160λ₁

MULTIPLE-WAVELENGTH BINARY DIFFRACTIVE LENSES

SPONSORSHIP INFORMATION

This invention was made with government support under Grant Number DMR-0213282, awarded by National Science Foundation. The government has certain rights in the invention.

BACKGROUND OF THE INVENTION

The invention relates to the field diffractive optics, and in particular to multiple-wavelength binary diffractive lenses.

Diffractive optics sculpt the propagation of light to generate complex intensity and phase patterns downstream. They achieve this by imposing a particular phase and intensity pattern on the incident light. Phase-only diffractive optics, as their name implies, affect only the phase, and hence are lossless. Binary-phase diffractive optics impose only two-levels of phase. This significantly eases the fabrication of such elements. The phase shift is achieved via an optical-path difference between alternate zones. Such optics inherently exhibit chromatic aberrations.

There have been several approaches to design multiple-wavelength diffractive optics. A heterogeneous design, based on materials with differing refractive indices and dispersion to compensate for chromatic aberration, was proposed. By using phase shifts that are integer multiples of 2π, harmonic diffractive lenses can be designed for specific discrete wavelengths. However, the selection of the design wavelengths is limited. A nonlinear optimization technique was used to design dual-wavelength diffractive beam-splitters. Blazed higher-order diffractive optics may also be designed for multiple wavelengths. In all these cases, the fabrication of the diffractive optic is difficult, either due to the multiple levels of phase-height or due to large aspect ratios.

SUMMARY OF THE INVENTION

According to one aspect of the invention, there is provided a dichromatic lens. The dichromatic lens includes a plurality of zones that are arranged on a lens structure, each of the zones having a specified radius and varying height. The lens structure focuses propagating light applicable to any intensity distribution for a plurality of wavelengths.

According to another aspect of the invention, there is provided a method of forming a dichromatic lens. The method includes forming a plurality of zones such that each of the zones has a specified radius. Also, the method includes varying the heights of the zones that allows focusing propagating light applicable to any intensity distribution for a plurality of wavelengths.

According to another aspect of the invention, there is provided a method of performing operations of a dichromatic lens. The method includes arranging a plurality of zones on a lens structure such that each of the zones has a specified radius and varying height. Also, the method includes lens structure focusing propagating light applicable to any intensity distribution for a plurality of wavelengths.

DETAILED DESCRIPTION OF THE INVENTION

The invention describes a technique that extends the use of nonlinear optimization to design lenses that can focus several wavelengths of light into different focal spots. The inventive lens structure focuses propagating light applicable to any intensity distribution for a plurality of wavelengths. In particular a dichromat lens is designed that focuses one wavelength, $\lambda_1$, to a bright spot and a second wavelength, $\lambda_2$, to an overlapping ring-shaped spot. The latter, with a node in its center, is a critical element in imaging schemes for breaking the far-field diffraction limit. The ring-shaped spot also has important applications in optical tweezers for trapping and manipulating particles whose refractive index is lower than that of the local environment. Such a dark spot may also have applications in trapping cold atoms. Focal spots with a dark center may be generated by focusing Laguerre-Gaussian modes, and higher-order Bessel beams.

In both cases, the null arises from the on-axis singularity in the phase of the wavefront. Such singularities can themselves be generated using diffractive elements, such as the spiral-phase plate or the spiral zone plate. The fabrication of such elements can be quite complicated, and the resulting phase profile is very sensitive to fabrication errors. Exotic interferometers have been used to generate nulls with up to 5 orders of magnitude lower intensity than the surrounding peak. These nulls are of interest in astronomy for finding faint planets orbiting a star. Phase plates that generate dark spots are also of interest in optical-projection photolithography.

One can follow the technique proposed originally by Toraldo di Francia, where the optic is composed of concentric circular zones, whose radii are the design variables. The phase shift between adjacent zones is an additional degree of freedom. This approach was shown to produce effective superresolving optical elements. Phase-only diffractive lenses with circular symmetry can be readily fabricated in a dielectric material using planar processes, enabling large arrays with high optical uniformity.

Figure 1A:
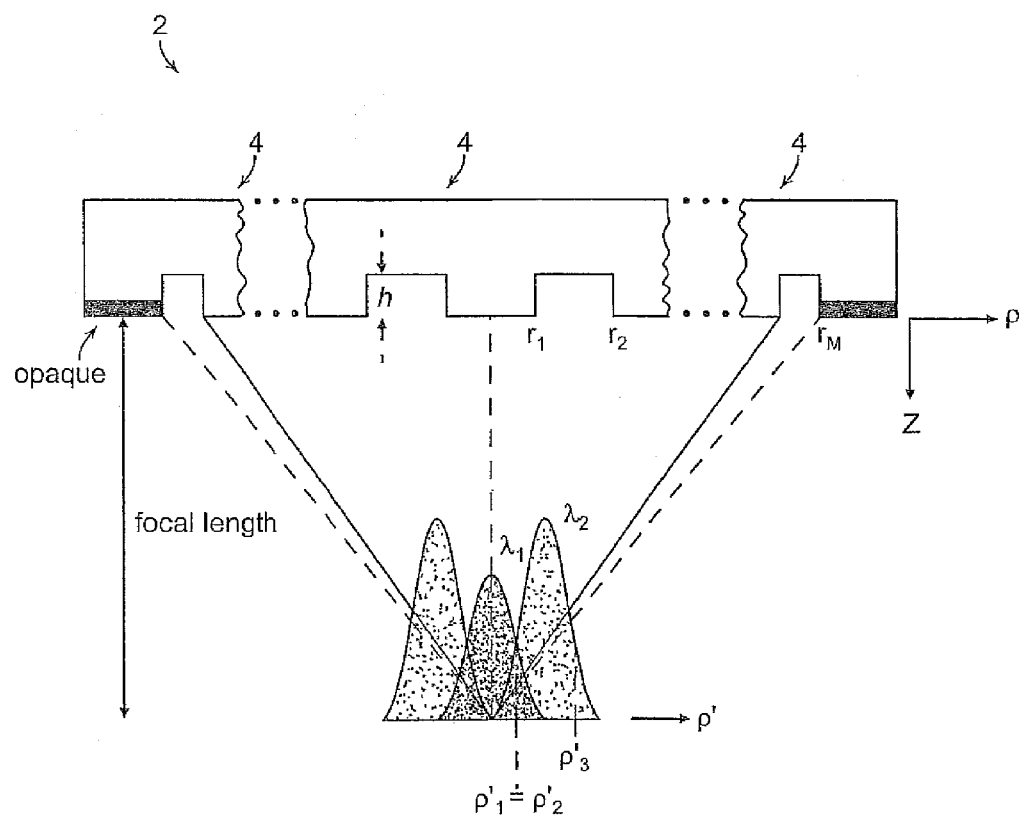
FIGS. 1A-1B are schematic diagram of the optic and design methodology of the invention.

FIG. 1A is a schematic diagram of the optic and design methodology of the inventive dichromat lens structure 2. The dichromat lens structure 2 includes a multitude of zones 4 having radii $r_1, r_2, \ldots, r_M$ and the height of the zones, h. Stylized intensity distributions in the focal plane illustrate the design requirement for a dichromat lens that focuses a bright spot at $\lambda_1$ and a ring-shaped spot at $\lambda_2$. Outside the dichromat lens is opaque. As shown in FIG. 1, the phase shift is achieved via a varying height difference between alternate zones. The optic can be described by a circular-symmetric transmission function.

$$T(\rho) = \begin{cases} e^{i\psi} & r_{2m} < \rho \leq r_{2m+1}, m \in I^+ \\ 0 & \rho > r_M \\ 1 & \text{elsewhere} \end{cases} \quad \text{EQ. 1}$$

where $\rho$ is the radial coordinate, $r_m$, is the radius of the $m^{th}$ zone, and M is the total number of zones. The relative phase-shift between neighboring zones, $\psi$, can be related to the zone height, h, via $$\psi = 2\pi \frac{h}{\lambda}[\text{Re}(n(\lambda)) - 1], \quad \text{EQ. 2}$$

where $\text{Re}(n(\lambda))$ is the real part of the refractive index of the lens material. The dichromat lens can focus propagating light applicable to any intensity distribution for a plurality of wavelengths beside 2 described above.

The Fresnel-Kirchoff formulation of the scalar-diffraction problem to model the propagation of light from the optic to the plane of observation is used. A normally incident uniform plane normally incident uniform plane wave is assumed for simplicity. The intensity in the observation plane is then given by $$Y(\rho', z, \lambda, \{\vec{r}, h\}) = \left| \frac{1}{i\lambda} \int_0^\infty \rho \, d\rho \int_0^{2\pi} d\phi T(\rho, \{\vec{r}, h\}) \right. \quad \text{EQ. 3}$$

$$\frac{\exp\left(i \frac{2\pi}{\lambda} \sqrt{\rho^2 + \rho'^2 - 2\rho\rho' \cos(\phi) + z^2}\right)}{\sqrt{\rho^2 + \rho'^2 - 2\rho\rho' \cos(\phi) + z^2}}$$

$$\left. \left(1 + \frac{z}{\sqrt{\rho^2 + \rho'^2 - 2\rho\rho' \cos(\phi) + z^2}}\right) \right|^2,$$

where z is the propagation distance along the optical axis, and $\rho'$ and $\phi'$ are cylindrical coordinates in the observation plane. The design variables are the radii of the zones, $\vec{r} = \{r_1, r_2, \ldots, r_m\}$ and the height of the zones, h.

The key step of the design process is the nonlinear optimization. The goal of the optimization is to achieve a certain diffraction pattern in the focal, or observation, plane. This goal is described in terms of an energy function. The technique is illustrated via a dichromat lens that focuses $\lambda_1$ to a round spot and $\lambda_2$ to a ring-shaped spot. The energy function for this design is then expressed as:

$$E(\{\vec{r}, h\}) = -w_1 \int_0^{\rho'_1} Y(\rho', \lambda_1, \{\vec{r}, h\}) \rho' \, d\rho' - \quad \text{EQ. 4}$$

$$w_2 \int_{\rho'_2}^{\rho'_3} Y(\rho', \lambda_2, \{\vec{r}, h\}) \rho' \, d\rho' + w_3 Y(\rho' = 0, \lambda_2, \{\vec{r}, h\}),$$

where $\rho_1'$ is the nominal radius of the round spot at $\lambda_1$, and $\rho_2'$ and $\rho_3'$ are the nominal inner and outer radii of the ring-shaped spot at $\lambda_2$. The variables w1, w2 and w3 are positive weights that allow relative emphasis of one term or another in the energy function. The last term adjusts the depth of the null in the center of the $\lambda_2$ spot. The optimization algorithm attempts to minimize the energy function. In addition, the following constraints are imposed.

$$r_p > r_q \forall M \geq p > q > 1, \{p, q\} \in I \quad \text{EQ. 5}$$

$$r_p - r_{p-1} > \Delta > 0 \forall M \geq p > 1, p \in I \quad \text{EQ. 6}$$

$$r_1 > 2\Delta \quad \text{EQ. 7}$$

The first constraint ensures that the zones are retained in the correct order during optimization. The second constraint ensures that the width of each zone is greater than $\Delta$, a constraint dictated by fabrication technology.

Figure 1B:
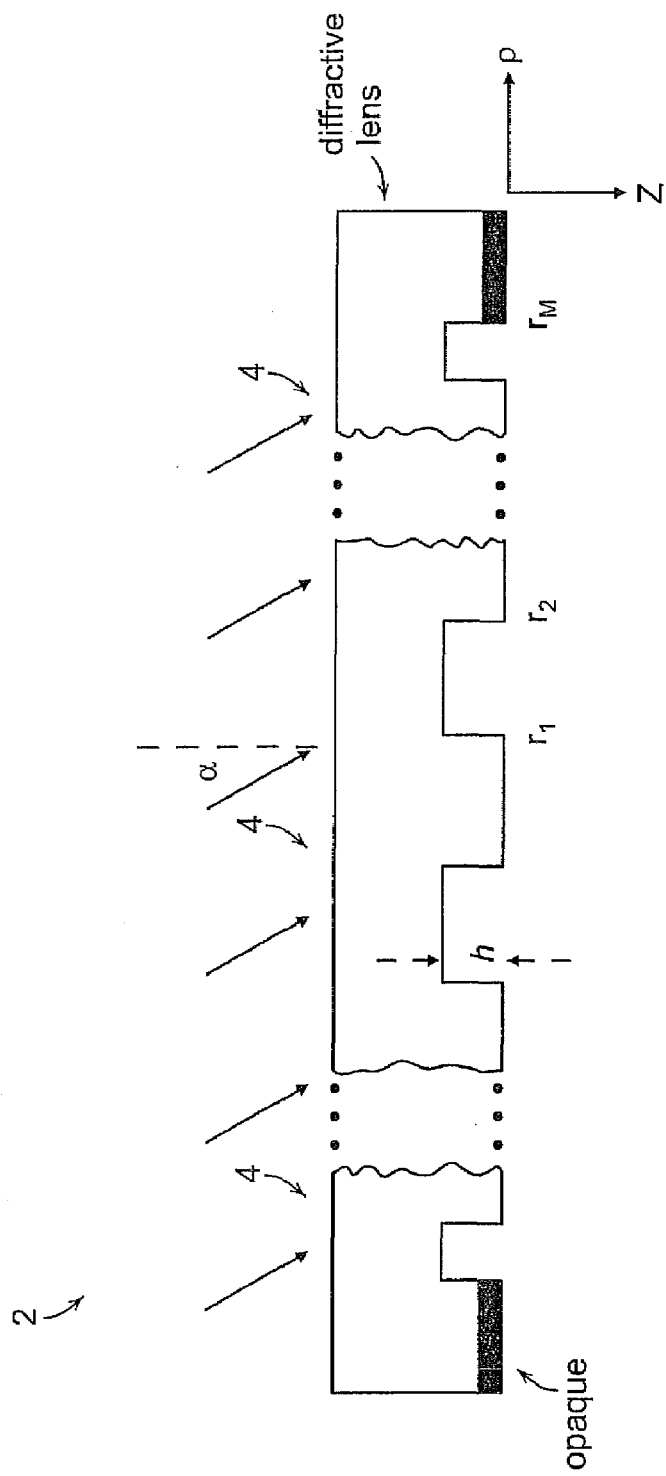

This inventive technique can be extended to describe the case of oblique illumination, as shown in FIG. 1B. In many optical applications, it is important to design the lenses with large acceptance angles. This is achieved by simply using a different set of equations to compute the intensity distribution in the observation or focal plane. All other aspects of the technique remain the same.

For an oblique angle of incidence, $\alpha$, the intensity in a plane at a distance z from the lens is given by $$Y_\alpha(\rho', z, \lambda, \alpha, \{\vec{r}, h\}) = \quad \text{EQ. 8}$$

$$\frac{A}{i\lambda} \int_0^{2\pi} d\phi \int_0^\infty \rho' \, d\rho' T(\rho, \{\vec{r}, h\}) \frac{\exp(ikd)}{d} \left\{ \cos\alpha + \frac{z}{d} \right\},$$

where T is the transmittance of the lens, $(\rho, \phi)$ are radial co-ordinates in the observation plane, and $(\rho, \phi)$ are radial co-ordinates in the lens plane, and d is given by $$d = \sqrt{(\rho\cos\phi - \rho'\cos\phi')^2 + (\rho\sin\phi - \rho'\sin\phi')^2 + z^2} \quad \text{EQ. 9}$$

If an incoherent addition of angles is desired, the energy function can be modified to sum over a range of incident angles. In a general form, the energy function can then be written as:

$$E = -\sum_i w_i \sum_I \int_{r_{i1}}^{r_{i2}} Y_\alpha(\rho', z, \lambda, \alpha, \{\vec{r}, h\}) \rho' \, d\rho', \quad \text{EQ. 10}$$

where the negative sign indicates that the energy is being minimized, $w_i$ are the weights associated with wavelength, $\lambda_i$, $r_{1i}$ and $r_{2I}$ are the inner and outer radii of the ring into which $\lambda_i$ is focused (if that is what is desired), and the summation over $_I$ takes the range of incident angles into account.

Although, the scalar Fresnel-Kirchoff diffraction theory is used in the examples, the invention is equally applicable for any theory that models the propagation of light from the diffractive lens to the observation or focal plane. Other applicable theories are the first and second Sommerfeld diffraction equations, finite-difference-time-domain methods, or the like. non-radial lenses as well. Also, the same design technique can be applied to linear (one-dimensional) lenses for 1-D focusing. The inventive technique can be applicable to any intensity distribution for each wavelength that can be specified by the user.

The transmission function of the optic is described by a piece-wise linear function as seen in equation (1). Free-space propagation is a highly nonlinear function of the spatial coordinates. Furthermore, the energy function and the constraints add additional nonlinearity. These characteristics make this problem ideal for a genetic algorithm. The genetic algorithm is an iterative mathematical version of natural selection. At each iteration, individuals from the population are chosen to mate based on the values of their energy functions. Offspring are produced by sharing "genes", i.e., the variables $\{\vec{r}, h\}$ or mutation, i.e., a random perturbation of the variables $\{\vec{r}, h\}$. This procedure is repeated until a set of variables is found that gives a global minimum for the energy function. The genetic algorithm is particularly appropriate to solve problems that are not well suited for standard optimization algorithms, such as when the energy function is discontinuous, non-differentiable, or highly nonlinear.

The technique described above was used to design a dichromat lens with numerical aperture 0.7, focal length 100 $\lambda_1$, and 80 zones. The design wavelengths were $\lambda_1$=400 nm, and $\lambda_2$=532 nm. The optimization was carried out with $\rho_1'=\rho_2'=0.5 \lambda_1/NA$ and $\rho_3'=1.22 \lambda_2/NA-\rho_2'$. The lens was assumed to be made of polymethylmethacrylate (PMMA), however other similar materials can be used. The refractive indices of PMMA were measured as 1.501 ($\lambda_1$=400 nm) and 1.487 ($\lambda_2$=532 nm). $\Delta$ was set to $0.5 \lambda_1$. The optimum weights were empirically determined, and set as $w_1$=1, $w_2$=10 and $w_3$=$10^4$.

Figure 2A:
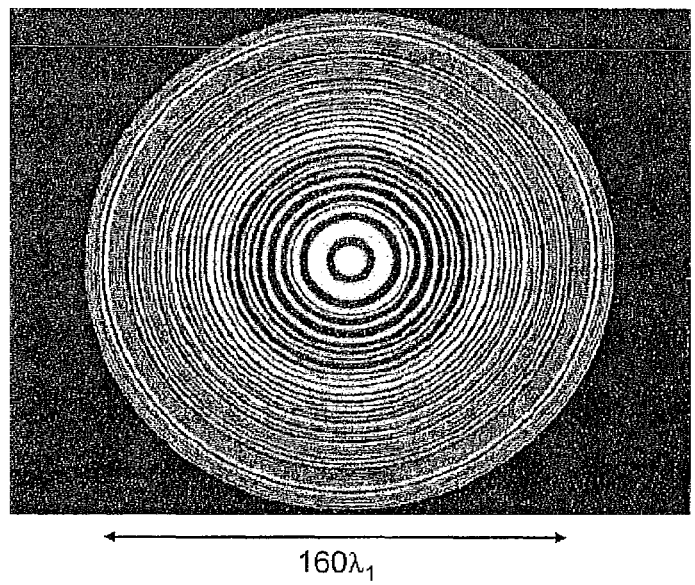
FIG. 2A is graph illustrating the transmission function of a dichromat lens structure formed in accordance with the invention.
Figure 2B:
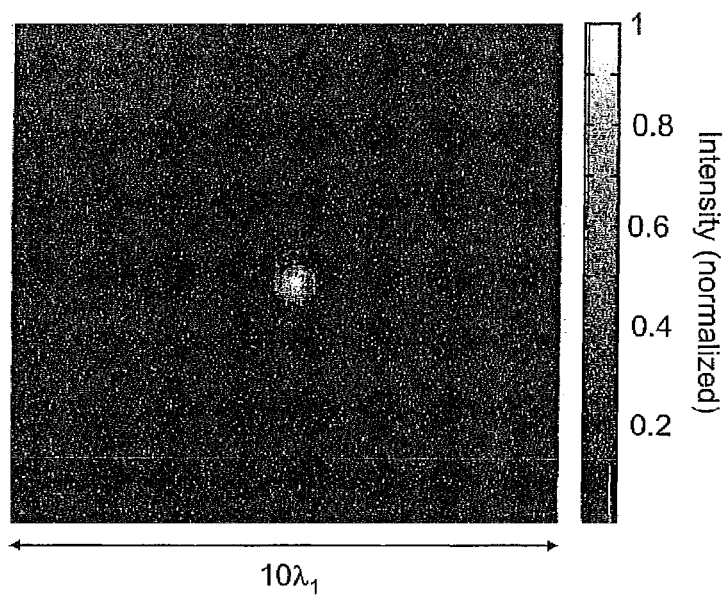
FIG. 2B is a graph illustrating the intensity in the focal plane for $\lambda_1$ illumination.
Figure 2C:
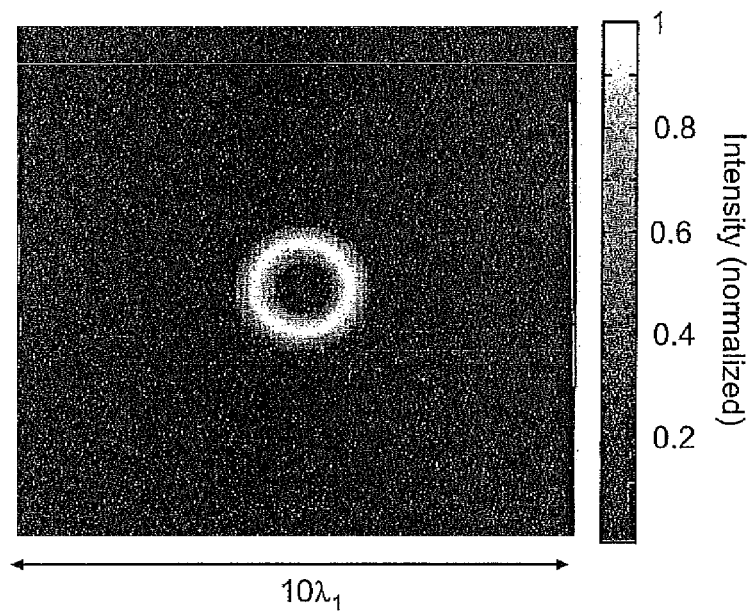
FIG. 2C is a graph illustrating the intensity in the focal plane for $\lambda_2$ illumination.
Figure 2D:
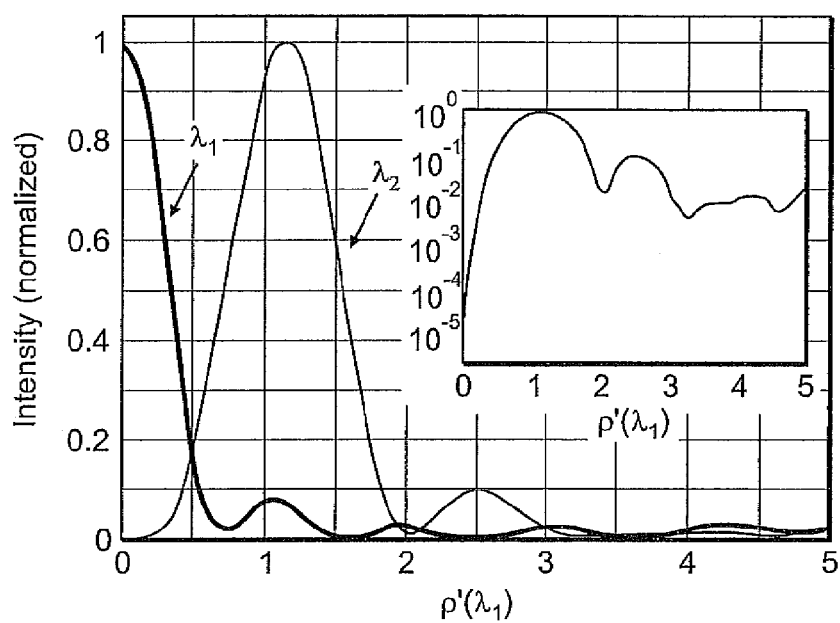
FIG. 2D is a graph illustrating the radial intensity distributions of the focal spots

The transmission function of the dichromat lens after 25 generations of a genetic algorithm is shown in FIG. 2A. Within the aperture of the dichromat lens, the dark rings are phase shifted with respect to the white ones; their relative height difference being 0.7367 $\lambda_1$. Outside the dichromat lens is opaque. The intensity distributions in the focal plane are shown in FIGS. 2B and 2C for $\lambda_1$ and $\lambda_2$, respectively. Radial cross-sections through the centers of the focal spots are plotted in FIG. 2D. Clearly, the technique was successful in designing a dichromat lens that focuses $\lambda_1$ to a round, bright spot and $\lambda_2$ to a ring-shaped spot. The inset in FIG. 2D shows that the intensity in the central null is about 5 orders of magnitude below that in the surrounding peak.

Figure 3A:
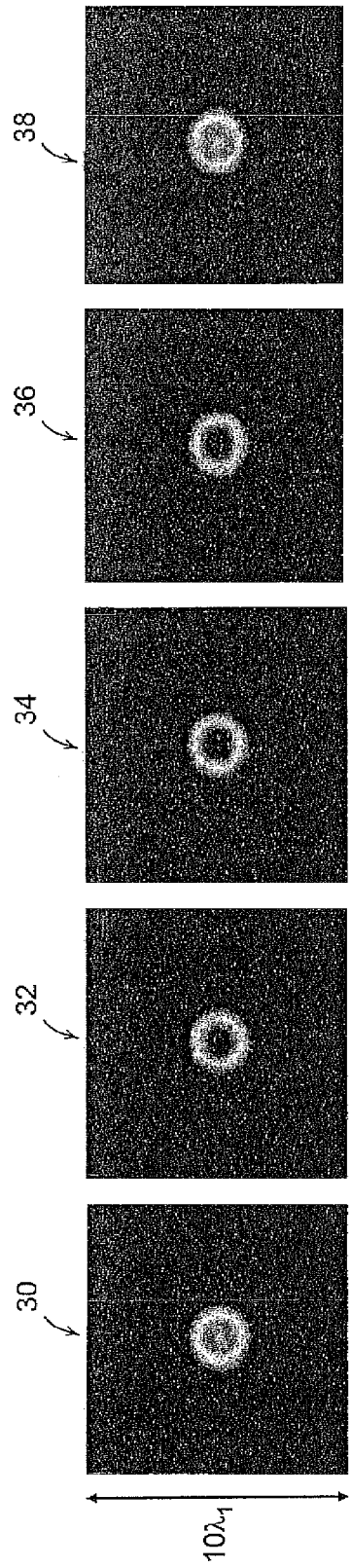
FIGS. 3A-3B are intensity distributions in various transverse planes near the focus of a dichromat lens for $\lambda_1$ and $\lambda_2$.
Figure 3B:
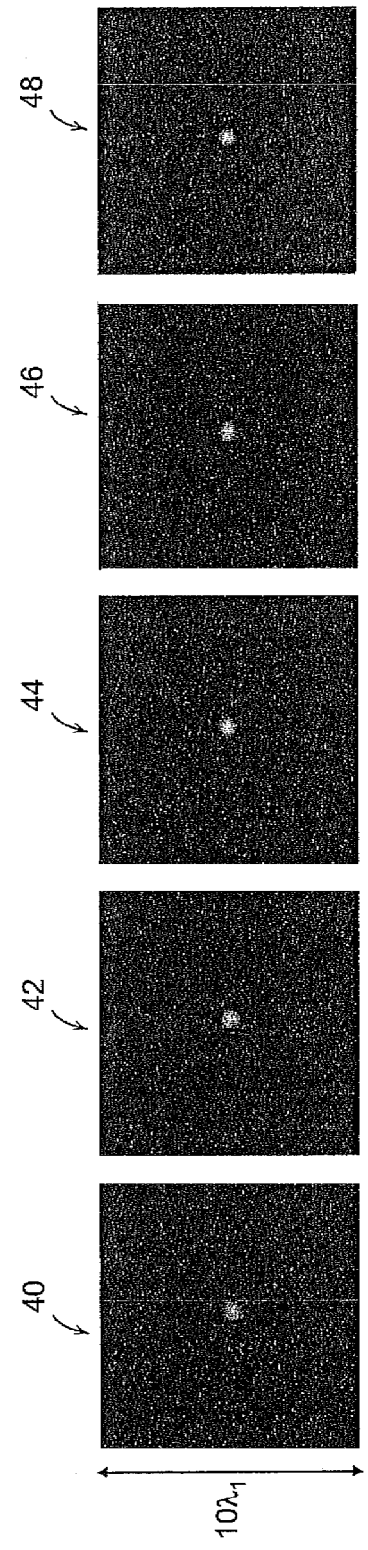

The focusing characteristics of the dichromat lens change as the observation plane is swept through the focus. This defines the useful depth-of-focus of the lens. FIG. 3A shows the focused spots for various values 30-38 of z. The ring at $\lambda_2$ is well-defined for a range of approximately $\lambda_1/2$. FIG. 3B shows the corresponding data 40-48 for $\lambda_1$. It was noticed that the intensity in the central node at $\lambda_2$ increases rapidly with defocus.

Assuming that the dichromat lens would be fabricated using planar processes, it is important to understand the sensitivity of the focusing characteristics to errors introduced during fabrication. Fabrication errors manifest themselves as errors in the radii of the zones and the height of the zones. Their effect can be simulated by adding randomly generated errors to the zone-radii and the phase height.

$$\vec{r} = \{r_1, r_2, \ldots, r_M\} \rightarrow \tilde{\vec{r}} = \{r_1 + \tilde{\delta}_{r1}, r_2 + \tilde{\delta}_{r2}, \ldots, r_M + \tilde{\delta}_{rM}\} \quad \text{EQ. 11}$$

$$h \rightarrow \tilde{h} = h + \tilde{\delta}_h \quad \text{EQ. 12}$$

where $\tilde{\delta}_{rp}$ and $\tilde{\delta}_h$ are randomly generated from two normal distributions of zero mean, and standard deviations, $\delta_r$ and $\delta_h$ respectively. In order to quantify the effect of the error, one can calculate the distribution of the focusing efficiencies of the error-prone dichromat lenses at the two wavelengths, and then, calculated their corresponding standard deviations. The focusing efficiencies are defined as:

$$\eta_1(\{\vec{r}, h\}) = \frac{\int_0^{\rho_1'} \Upsilon(\rho', \lambda_1, \{\vec{r}, h\}) \rho' d\rho'}{\int_0^{\infty} \Upsilon(\rho', \lambda_1, \{\vec{r}, h\}) \rho' d\rho'} \quad \text{EQ. 13}$$

and $$\eta_2(\{\vec{r}, h\}) = \frac{\int_{\rho_2'}^{\rho_3'} \Upsilon(\rho', \lambda_2, \{\vec{r}, h\}) \rho' d\rho'}{\int_0^{\infty} \Upsilon(\rho', \lambda_2, \{\vec{r}, h\}) \rho' d\rho'} \quad \text{EQ. 14}$$

Figure 4A:
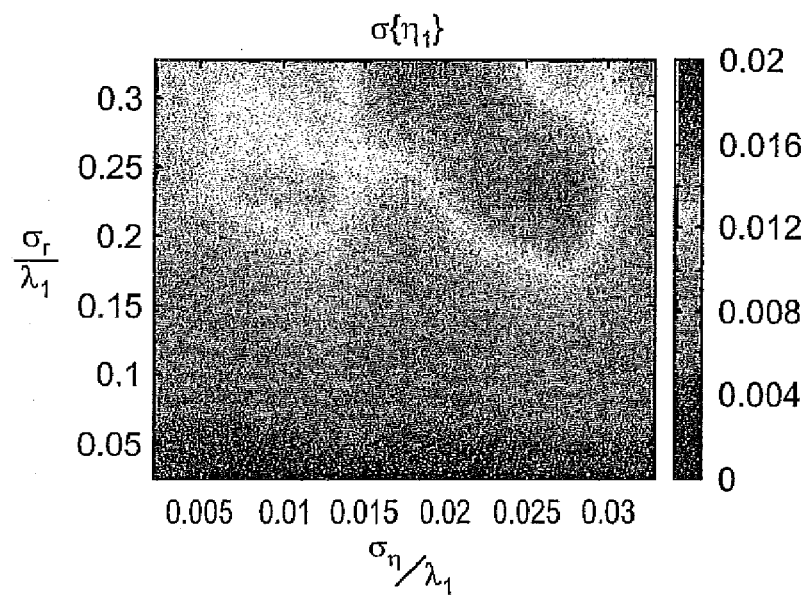
FIGS. 4A-4B are graphs illustrating the standard deviations of the diffraction efficiencies at $\lambda_1$ and $\lambda_2$.
Figure 4B:
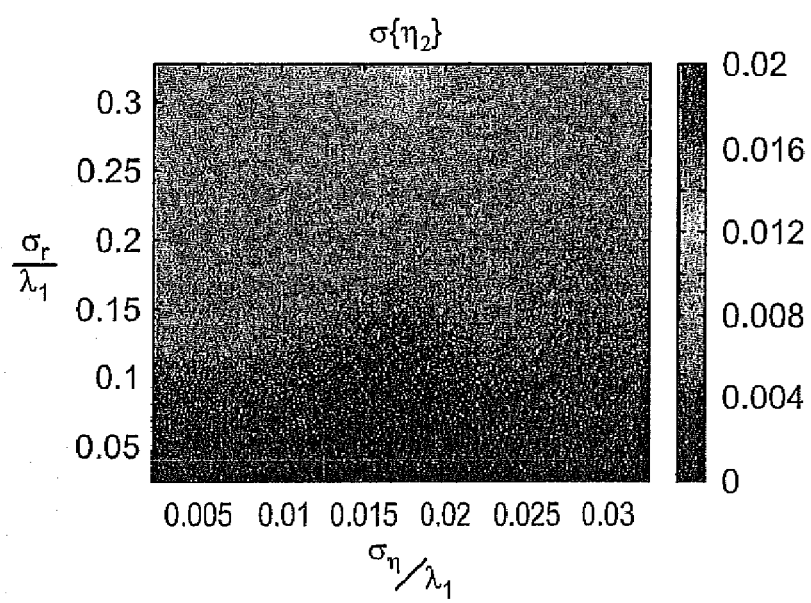
Figure 4C:
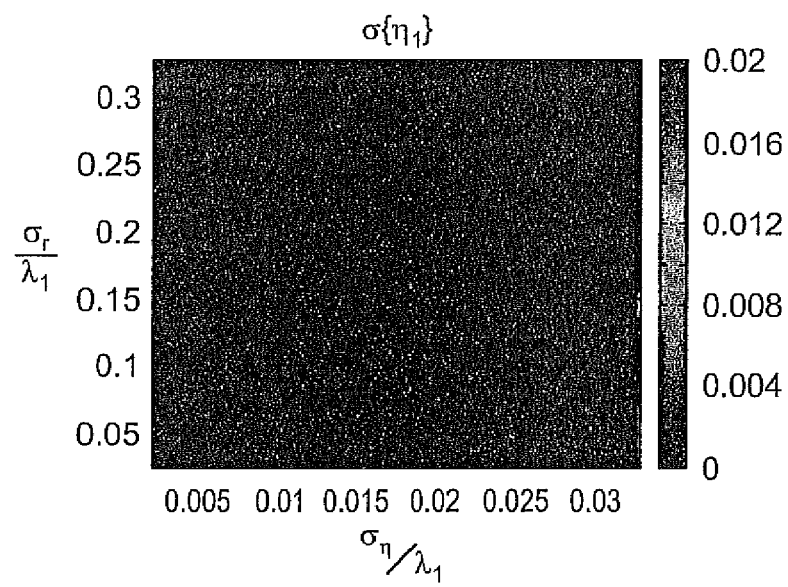
FIGS. 4C-4D are graphs corresponding to data for a newly optimized dichromat lens.
Figure 4D:
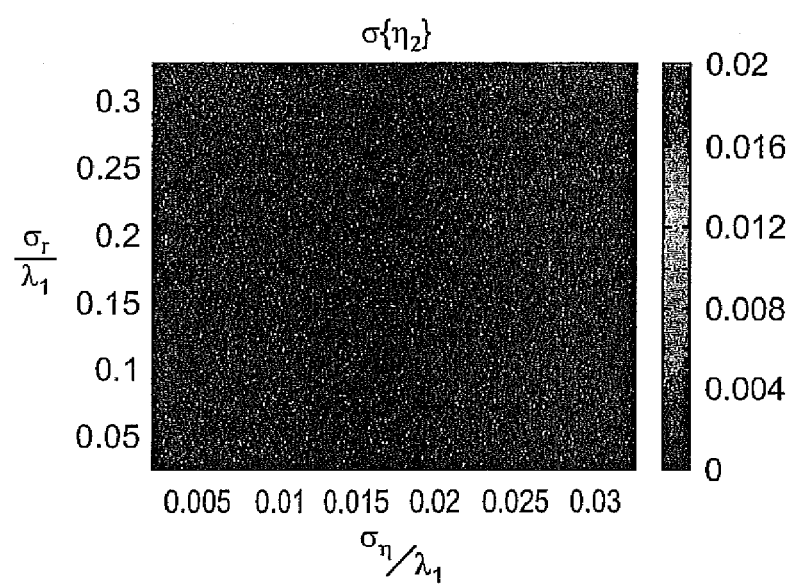
Figure 4E:
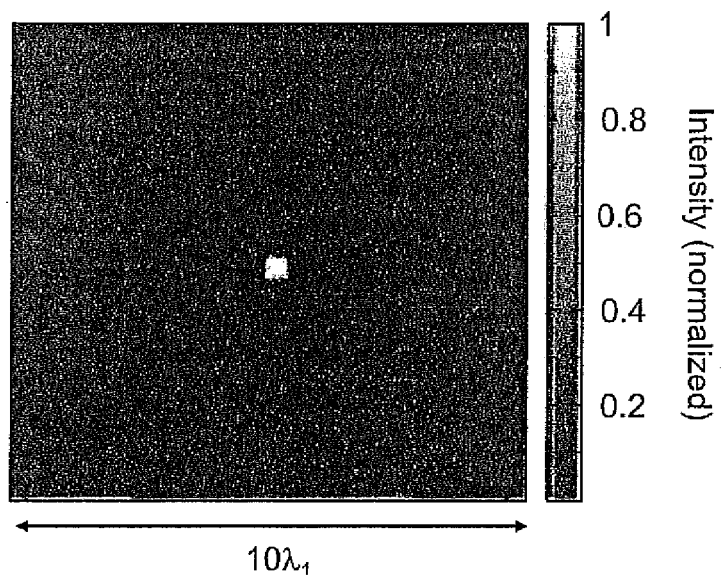
FIGS. 4E-4F are graphs illustrating the focal intensity distributions for the new dichromat lens at $\lambda_1$ and $\lambda_2$.
Figure 4F:
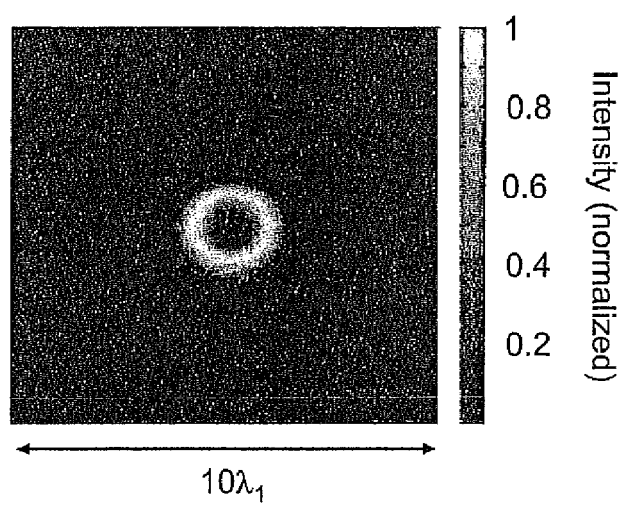
Figure 4G:
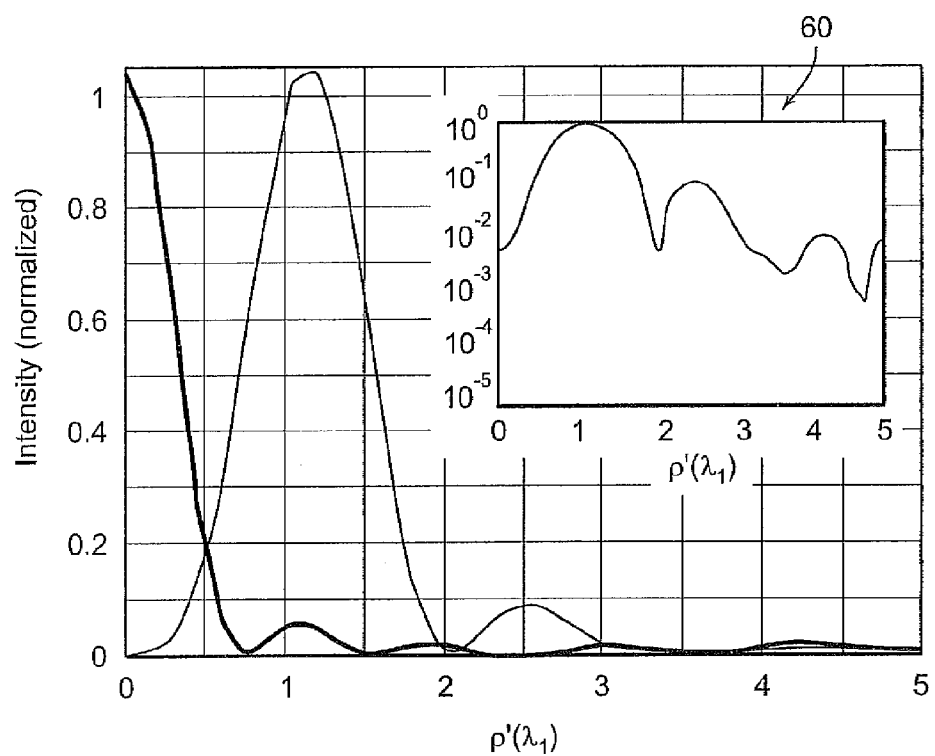
FIG. 4G is a graph illustrating the radial intensity distributions in the focal plane.

The robustness of the dichromat lens was investigated by calculating the standard deviations of the diffraction efficiencies, $$\sigma\{\eta_1(\{\tilde{\vec{r}}, \tilde{h}\})\} \text{ and } \sigma\{\eta_2(\{\tilde{\vec{r}}, \tilde{h}\})\}$$

as a function of $\delta_r$ and $\delta_h$. The results for the original dichromat lens are shown in FIGS. 4A and 4B. In order to design a more robust dichromat lens, one can define a new energy function as follows:

$$E_r(\{\vec{r}, h\}) = \mu\{E(\{\tilde{\vec{r}}, \tilde{h}\})\} + \sigma\{E(\{\tilde{\vec{r}}, \tilde{h}\})\}, \quad \text{EQ. 15}$$

where $\mu\{\}$ and $\sigma\{\}$ denote mean and standard deviation respectively. This energy function was used to design a new dichromat lens with the same parameters as described earlier. Standard deviations, $\delta_r = \lambda_1/8$ and $\delta_h = \lambda_1/16$ were used during the optimization. After 25 generations of the genetic algorithm, a second dichromat lens design was obtained. This design was significantly more robust to fabrication errors as illustrated by the dramatically reduced variation in their diffractive efficiencies, as shown in FIGS. 4C and 4D. The focal intensities of the new dichromat lens at $\lambda_1$ and $\lambda_2$ are shown in FIGS. 4E and 4F. Note that the depth of the central null at $\lambda_2$ is slightly worse than in the original dichromat lens. This is characteristic of optimization, where one quality is traded off against another. It is likely that better energy functions can attain higher quality nulls, while maintaining error-tolerance. FIG. 4G is a graph illustrating the radial intensity distributions in the focal plane. The inset 60 shows the $\lambda_2$ distribution on a log-scale.

The proposed technique is easily extended to more than two wavelengths. One can demonstrate this by designing a trichromat, a lens that can focus $\lambda_1$ and $\lambda_3$ into bright spots, while $\lambda_2$ is focused into a ring-shaped spot. The energy function is modified as follows.

$$E(\{\vec{r}, h\}) = -w_1 \int_0^{\rho_1'} \Upsilon(\rho', \lambda_1, \{\vec{r}, h\}) \rho' d\rho' - \quad \text{EQ. 16}$$

$$w_2 \int_{\rho_2'}^{\rho_3'} \Upsilon(\rho', \lambda_2, \{\vec{r}, h\}) \rho' d\rho' +$$

$$w_3 \Upsilon(\rho' = 0, \lambda_2, \{\vec{r}, h\}) - w_4 \int_0^{\rho_4'} \Upsilon(\rho', \lambda_3, \{\vec{r}, h\}) \rho' d\rho',$$

where $\rho_4'$ is the desired spot radius for $\lambda_3$ and $w_4$ is the weight for the last term. The parameters for the optimization were $\lambda_3$=633 nm, $\rho_4'$=1.22 $\lambda_3$/NA and $w_4$=−10. The refractive index of PMMA at $\lambda_3$ was measured as 1.4812. All other parameters were the same as for the original dichromat lens.

Figure 5A:
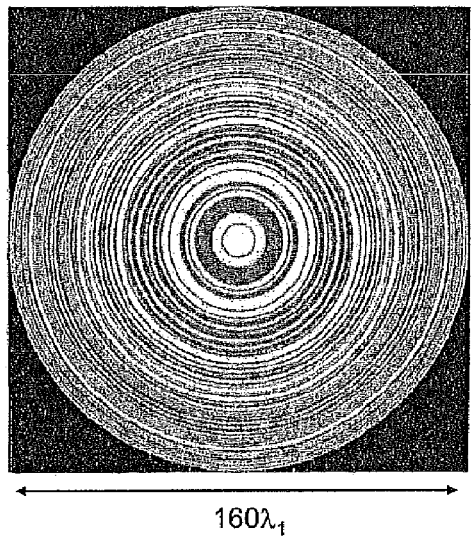
FIG. 5A is a graph illustrating the transmission function of a trichromat structure formed in accordance with the invention.
Figure 5B:
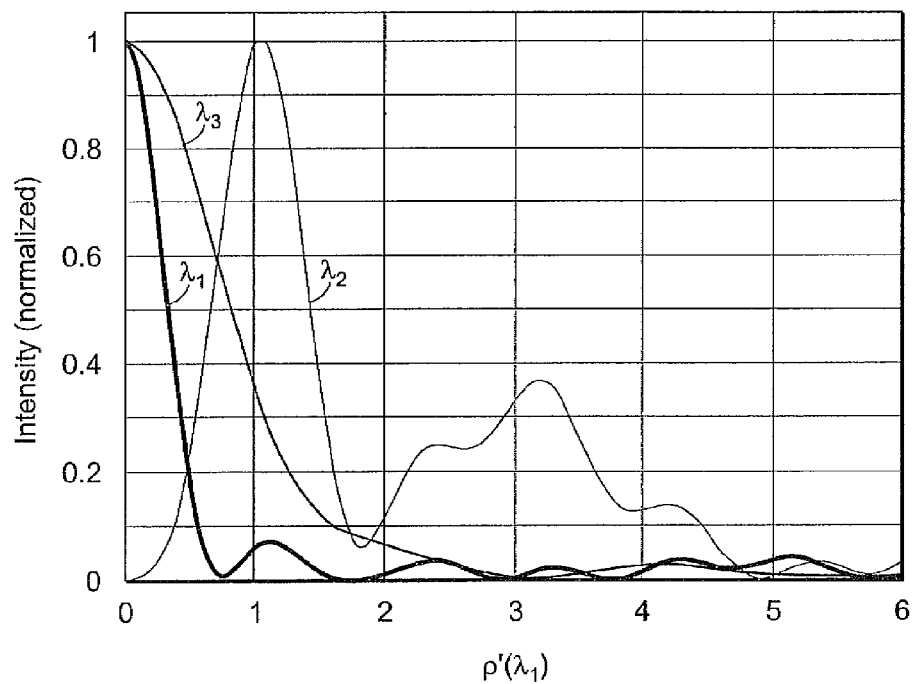
FIG. 5B is a graph illustrating the intensity distributions in the focal plane at the 3 wavelengths.

FIG. 5A shows the transmission function of the trichromat after 50 generations of optimization. FIG. 5B shows the intensities in the focal plane for the three wavelengths. The inventive technique can, therefore be extended to an arbitrary number of discrete wavelengths with the added flexibility of being able to specify different focal distributions at each design wavelength.

The invention describes a technique based on non-linear optimization using genetic algorithms to design binary, phase-only diffractive optics for multiple wavelengths. It has been demonstrated the efficacy of this technique by designing a dichromat lens, a lens that focuses $\lambda_1$ to a central bright spot and $\lambda_2$ to a ring-shaped spot with a deep central null. It is shown that the design technique is flexible enough to incorporate robustness to fabrication errors, and is easily extended to more than two wavelengths simply by incorporating appropriate optimization criteria.

Although the present invention has been shown and described with respect to several preferred embodiments thereof, various changes, omissions and additions to the form and detail thereof, may be made therein, without departing from the spirit and scope of the invention.

What is claimed is:

1. A dichromatic lens comprising:
a plurality of zones arranged on a lens structure, each of said zones having a specified radius and varying height, said lens structure focusing propagating light applicable to any intensity distribution for a plurality of wavelengths, said lens structure focusing propagating light to a bright spot at a specified first wavelength and a ring-shaped spot at a specified second wavelength when a phase shift occurs because of varying heights of said zones.

2. The dichromatic lens of claim 1, wherein the radius and height of each of the zones is based on the desired intensity distributions in the observation plane for any number of said wavelengths.

3. The dichromatic lens of claim 1, wherein lens structure receives incoming light at an oblique angle.

4. The dichromatic lens of claim 1, wherein said lens structure comprises polymethylmethacrylate (PMMA).

5. The dichromatic lens of claim 1, wherein said lens structure comprises an aperture.

6. The dichromatic lens of claim 5, wherein said ring-shaped spot comprises dark rings that are phase shifted with respect to white rings using said aperture.

7. The dichromatic lens of claim 1, wherein said ring-shaped spot comprises a deep central null.

8. The dichromatic lens of claim 1, wherein said first wavelength is UV and said second wavelength is the visible wavelength.

9. A method of forming a dichromatic lens comprising:
providing a lens structure;
forming a plurality of zones on said lens structure such that each of said zones has a specified radius;
varying the heights of said zones that allows focusing propagating light applicable to any intensity distribution for a plurality of wavelengths, said lens structure focusing propagating light to a bright spot at a specified first wavelength and a ring-shaped spot at a specified second wavelength when a phase shift occurs because of varying heights of said zones.

10. The method of claim 9, wherein the radius and height of each of the zones is based on the desired intensity distributions in the observation plane for any number of said wavelengths.

11. The method of claim 9, wherein lens structure receives incoming light at an oblique angle.

12. The method of claim 9, wherein said lens structure comprises polymethylmethacrylate (PMMA).

13. The method of claim 9, wherein said lens structure comprises an aperture.

14. The method of claim 13, wherein said ring-shaped spot comprises dark rings that are phase shifted with respect to white rings using said aperture.

15. The method of claim 9, wherein said ring-shaped spot comprises a deep central null.

16. The method of claim 9, wherein said first wavelength is UV and said second wavelength is the visible wavelength.

17. A method of performing operations of a dichromatic lens comprising:
arranging a plurality of zones on a lens structure such that each of said zones having a specified radius and varying height;
focusing propagating light applicable to any intensity distribution for a plurality of wavelengths, said lens structure focusing propagating light to a bright spot at a specified first wavelength and a ring-shaped spot at a specified second wavelength when a phase shift occurs because of varying heights of said zones.

18. The method of claim 17, wherein the radius and height of each of the zones is based on the desired intensity distributions in the observation plane for any number of said wavelengths.

19. The method of claim 17, wherein lens structure receives incoming light at an oblique angle.

20. The method of claim 17, wherein said lens structure comprises polymethylmethacrylate (PMMA).

21. The method of claim 17, wherein said lens structure comprises an aperture.

22. The method of claim 21, wherein said ring-shaped spot comprises dark rings that are phase shifted with respect to white rings using said aperture.

23. The method of claim 17, wherein said ring-shaped spot comprises a deep central null.

24. The method of claim 17, wherein said first wavelength is UV and said second wavelength is the visible wavelength.

* * * * *